United States Patent
Zhang et al.

(10) Patent No.: US 11,131,788 B2
(45) Date of Patent: Sep. 28, 2021

(54) CAPTURE GAMMA RAY SPECTROSCOPY FOR ANALYZING GRAVEL-PACKS, FRAC-PACKS AND CEMENT

(71) Applicant: CARBO CERAMICS INC., Houston, TX (US)

(72) Inventors: Jeremy Zhang, Katy, TX (US); Harry D. Smith, Jr., Spring, TX (US)

(73) Assignee: CARBO CERAMICS, INC., Houston, TX (US)

(*) Notice: Subject to any disclaimer, the term of this patent is extended or adjusted under 35 U.S.C. 154(b) by 244 days.

(21) Appl. No.: 15/594,036

(22) Filed: May 12, 2017

(65) Prior Publication Data
US 2017/0329041 A1    Nov. 16, 2017

Related U.S. Application Data

(60) Provisional application No. 62/336,114, filed on May 13, 2016.

(51) Int. Cl.
*G01V 5/10* (2006.01)
*E21B 49/00* (2006.01)
*E21B 47/09* (2012.01)
*E21B 47/005* (2012.01)
(Continued)

(52) U.S. Cl.
CPC ............ *G01V 5/105* (2013.01); *E21B 33/14* (2013.01); *E21B 43/04* (2013.01); *E21B 43/267* (2013.01);
(Continued)

(58) Field of Classification Search
CPC ........ E21B 33/14; E21B 43/04; E21B 43/267; E21B 47/0005; E21B 47/09; E21B 49/00; G01V 5/105; G01V 5/101
See application file for complete search history.

(56) References Cited

U.S. PATENT DOCUMENTS

| 4,021,666 A | 5/1977 | Allen |
| 4,760,252 A | 7/1988 | Albats et al. |
(Continued)

OTHER PUBLICATIONS

International Search Report and Written Opinion for International Aplication No. PCT/US2017/032443 dated May 12, 2017.
(Continued)

*Primary Examiner* — Nicole Coy
*Assistant Examiner* — Yanick A Akaragwe
(74) *Attorney, Agent, or Firm* — Patterson + Sheridan, LLP

(57) ABSTRACT

Methods of using capture gamma-ray spectroscopy for analyzing gravel-packs, frac-packs, and cement are disclosed herein. The methods can include distinguishing particles placed in a borehole region from particles placed in a subterranean formation outside of the borehole region, by utilizing a slurry comprising a liquid, particles, and a thermal neutron absorbing material to place the particles into the borehole region. The methods can also include obtaining first and second data sets by lowering into a borehole traversing the borehole region a pulsed neutron logging tool comprising a pulsed neutron source and a detector, emitting pulses of neutrons from the pulsed neutron source into the borehole region at intervals of one pulse per about 1,000 μsec for the first data set and about one pulse per about 100 μsec for the second data set, and detecting capture gamma rays resulting from nuclear reactions in the borehole and the subterranean formation.

15 Claims, 2 Drawing Sheets

(51) Int. Cl.
  *E21B 33/14*  (2006.01)
  *E21B 43/04*  (2006.01)
  *E21B 43/267* (2006.01)

(52) U.S. Cl.
  CPC ............ *E21B 47/005* (2020.05); *E21B 47/09* (2013.01); *E21B 49/00* (2013.01); *G01V 5/101* (2013.01)

(56) References Cited

U.S. PATENT DOCUMENTS

| | | |
|---|---|---|
| 4,825,073 A | 4/1989 | Smith, Jr. et al. |
| 5,410,152 A | 4/1995 | Gadeken |
| 5,635,712 A | 6/1997 | Scott et al. |
| 8,100,177 B2 | 1/2012 | Smith, Jr. et al. |
| 8,214,151 B2 | 7/2012 | Duenckel et al. |
| 8,648,309 B2 | 2/2014 | Smith, Jr. et al. |
| 8,963,073 B2 | 2/2015 | Grau et al. |
| 9,038,715 B2 | 5/2015 | Smith, Jr. et al. |
| 2004/0020646 A1* | 2/2004 | Flecker .................. E21B 43/04 166/253.1 |
| 2007/0011115 A1 | 1/2007 | Smith et al. |
| 2011/0198488 A1 | 8/2011 | Stoller et al. |
| 2013/0234012 A1 | 9/2013 | Morris et al. |
| 2016/0024909 A1 | 1/2016 | Han et al. |
| 2017/0329041 A1 | 11/2017 | Zhang et al. |

OTHER PUBLICATIONS

Great Britain Examination Report dated Dec. 16, 2020 for Application No. 1820287.9.

\* cited by examiner

CAPTURE GAMMA RAY SPECTROSCOPY FOR ANALYZING GRAVEL-PACKS, FRAC-PACKS AND CEMENT

FIELD

The present disclosure relates to wellbore operations, and more specifically to methods for identifying material placed in a borehole region using capture gamma ray spectroscopy.

BACKGROUND

In order to enhance hydrocarbon production in cased holes, pack material is placed in the annular space between the casing and an interior screen or liner, in a so-called gravel-pack. In a so-called "cased hole frac-pack", the pack material is also placed outside the well casing into formation fractures. In other situations involving an uncased wellbore, in a so-called open-hole fracturing, frac-packing, or gravel packing operation, frac material is placed outside a perforated liner or a screen. In open-hole fracturing and frac-packing, frac material is also placed out into induced fractures in the formation. In cementing operations, cement material is mixed with water to form a cement slurry that is placed in the borehole region outside the well casing, and/or in the space between two or more wellbore tubulars.

The pack material can be solids or proppants, which are generally composed of sand grains or ceramic particles, and the fluid used to pump these solids downhole. In frac-pack or gravel-pack operations, the proppants and/or other pack materials are placed in the annular space between a well casing and an interior screen or liner in a cased-hole frac-pack or gravel-pack, and also in fractures in the formation in the frac-pack. Pack materials can also be placed in an annular space in the wellbore outside a screen or liner in open-hole fracturing, frac-packing, or gravel packing operations. Pack materials are primarily used to filter out solids being produced along with the formation fluids in oil and gas well production operations. This filtration assists in preventing these sand or other particles from being produced with the desired fluids into the borehole and to the surface. Such undesired particles might otherwise damage well and surface tubulars and complicate fluid separation procedures due to the erosive nature of such particles as the well fluids are flowing. In cementing operations, pack material can be admixed with the cement material and water to form the cement slurry that is then placed in the borehole region outside the well casing, and/or in the space between two or more wellbore tubulars.

Technology for locating proppant (or other pack solids) tagged with a non-radioactive tracer containing a high thermal neutron capture cross section material has focused on nuclear well logging using two basic methods. The first method uses non-spectroscopy based pulsed neutron capture (PNC) and/or compensated neutron (CNT) logging tools, to locate tagged proppant downhole in induced fractures, gravel packs, frac-packs, and cement, including methods to distinguish the non-radioactive tracer material in the borehole region from that out in the formation fractures. The second method utilizes capture gamma ray spectroscopy, usually using PNC logging tools, to locate gadolinium, Gd, tagged proppant placed downhole, primarily in induced downhole fractures, by spectrally resolving the capture gamma rays emanating from the tag material (e.g., the gadolinium signal/yield) from the capture gamma rays coming from other downhole elements. While this spectroscopy based method has been successfully used to locate tagged material in gravel pack and frac-pack operations, there has been no capture gamma ray spectroscopy based method developed to spectrally distinguish non-radioactive tracer material inside the well casing in the borehole region (e.g., in a gravel pack or frac pack annulus) from tagged material placed outside the well casing (e.g., in the formation fractures in a frac pack procedure).

As can be seen from the foregoing, a need exists for subterranean fracture location detection methods which alleviate at least some of the above-mentioned problems, limitations and disadvantages associated with previously utilized gravel-pack, frac-pack and cement evaluation techniques as generally described above.

DETAILED DESCRIPTION

Figure 1:
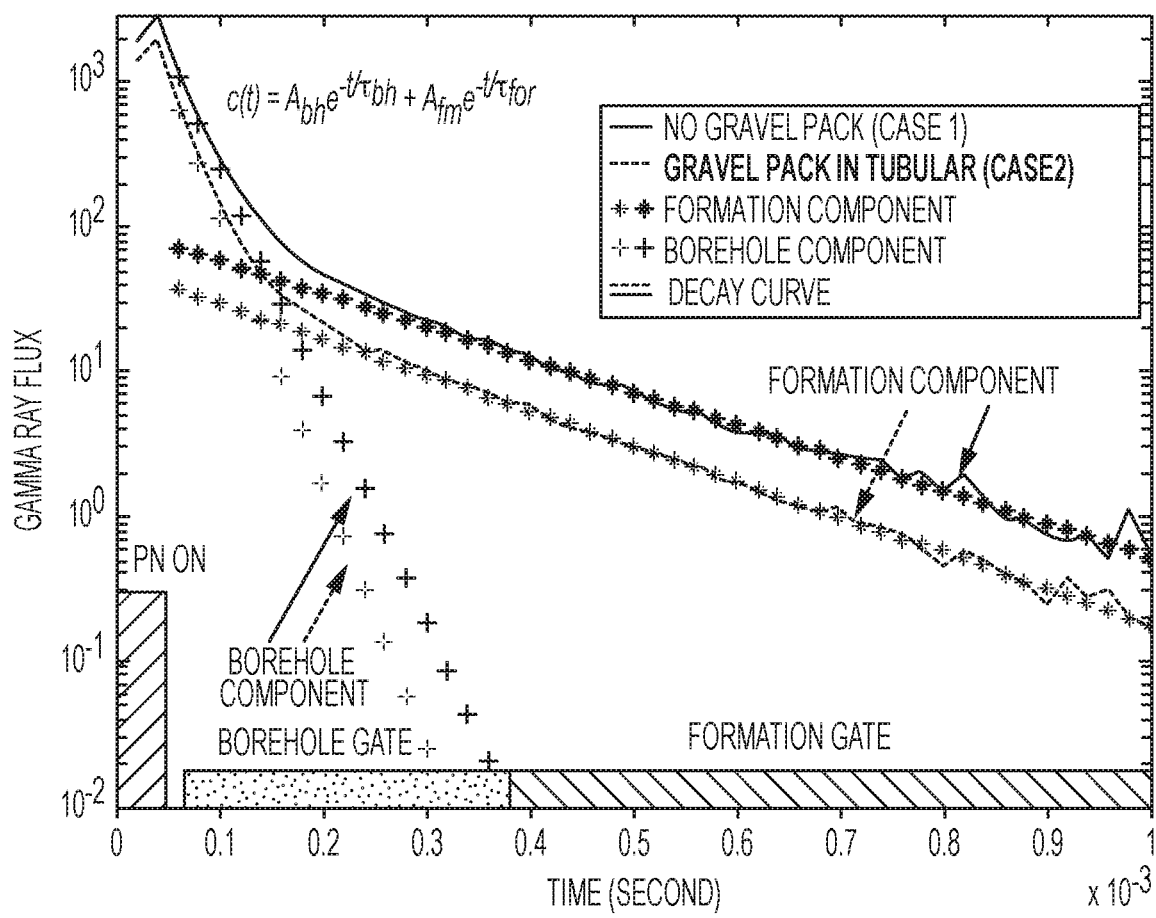
FIG. 1 shows a Monte Carlo simulation of a PNC capture gamma ray decay curve in a cased downhole formation in which $Gd_2O_3$ tagged pack material has been placed in a gravel pack annulus in a borehole region between the outer well casing and an interior liner/screen.

According to several exemplary embodiments, a method is provided for determining the location of tagged material using capture gamma rays emitted from a pulsed neutron capture (PNC) tool. The method can include obtaining a pre-gravel-pack data set, placing a slurry that includes a liquid and a pack material in which all or a fraction of such pack material includes a thermal neutron absorbing material into a borehole region of a wellbore, obtaining a post-gravel-pack data set, comparing the pre-gravel-pack data set and the post-gravel-pack data set to distinguish pack material inside a well casing from pack material outside the well casing. In one or more exemplary embodiments, the method can include obtaining a pre-frac-pack data set, placing a slurry that includes a liquid and a pack material in which all or a fraction of such pack material includes a thermal neutron absorbing material into a borehole region of a wellbore and a subterranean formation fracture located adjacent to the borehole region, obtaining a post-frac-pack data set, comparing the pre-frac-pack data set and the post-frac-pack data set to distinguish pack material inside a well casing from pack material outside the well casing. According to several exemplary embodiments, the pre-gravel-pack data set, pre-frac-pack data set, and pre-cementing data set can be eliminated. For example, the pre-gravel-pack data set, pre-frac-pack data set, and pre-cementing data set can be eliminated if capture gamma ray spectral data processing is included in the log processing.

The pre-gravel-pack and post-gravel-pack data sets, the pre-frac-pack and post-frac-pack data sets, and the pre-cementing and post-cementing data sets can each be obtained by lowering into a borehole traversing a subterranean formation, a neutron emitting tool including a pulsed fast neutron source and one or more gamma ray detectors, emitting pulses of fast neutrons from the neutron source into the borehole and formation, and detecting in the borehole region inelastic and capture gamma rays resulting from nuclear reactions of the source neutrons with elements in the borehole region and subterranean formation. For purposes of this application, the term "borehole region" includes the logging tool, the borehole fluid, the tubulars in the wellbore and any other annular material such as cement that is located between the formation and the tubular(s) in the wellbore.

PNC logging tools can pulse the neutron source about every millisecond and can measure the resulting gamma radiation produced by interactions of the neutrons from the source with the nuclei of the materials in the formation and borehole region adjacent to the logging tool. The detected PNC related gamma radiation can fall into three categories: (1) inelastic gamma radiation produced by high energy neutron interactions with the downhole nuclei, (2) thermal neutron capture gamma radiation produced almost instantaneously when the thermalized source neutrons are captured by downhole nuclei, and (3) neutron activation gamma radiation, which are produced during the subsequent radioactive decay of nuclei activated by either fast or thermal neutrons. PNC thermal neutron capture gamma ray count rate is very strongly dependent on the thermal neutron absorptive properties of the NRT tag material, as disclosed in: U.S. Pat. Nos. 8,100,177, 8,214,151, 8,234,072, 8,648,309, 8,805,615, 9,038,715; SPE papers 146744 and 152169; and *Petrophysics* vol. 54, No 5, pp 415-426, each of which are incorporated by reference herein in their entirety. According to several exemplary embodiments which utilize a PNC tool, the PNC logging tool generates data that includes log inelastic and capture gamma ray count rates, computed formation thermal neutron capture cross-sections, computed borehole thermal neutron capture cross-sections, computed formation and borehole decay component count rate related parameters, and/or the computed yield of the tag material in the proppant and possibly other downhole materials, as derived from analysis of the capture (and possibly inelastic) gamma ray spectra obtained by the tool.

The pack material or proppant can be or include any material suitable for use in gravel pack, frac-pack, and cementing applications. For example, the proppant can be or include sand, ceramic proppant, gravel, or any other solid particles suitable for use in a downhole environment. The proppant can contain the thermal neutron absorbing material. For example, the slurry can include a proppant containing the thermal neutron absorbing material. The proppant doped with the thermal neutron absorbing material has a thermal neutron capture cross-section exceeding that of elements normally encountered in subterranean formation. According to several exemplary embodiments, the proppant containing the thermal neutron absorbing material has a macroscopic thermal neutron capture cross-section of at least about 90 capture units. According to several exemplary embodiments, the proppant containing the thermal neutron absorbing material has a macroscopic thermal neutron capture cross-section of at least about 900 capture units. According to several exemplary embodiments, the proppant material is a granular ceramic material, with substantially every grain of the proppant material having a high capture cross section thermal neutron absorbing material integrally incorporated therein.

According to several exemplary embodiments, the thermal neutron absorbing material comprises gadolinium, boron, cadmium, iridium, samarium, or mixtures thereof.

According to several exemplary embodiments which utilize a PNC logging tool, capture gamma ray spectroscopy and spectral deconvolution may be used to detect, isolate, and identify gamma radiation which was emitted following thermal neutron capture by the thermal neutron absorbing material in the proppant.

Suitable high capture cross-section materials include gadolinium oxide, samarium oxide, boron carbide, and combinations thereof. A proppant containing 0.030% by weight of gadolinium oxide has a macroscopic capture cross-section of approximately 92 capture units. A suitable proppant containing 0.1% by weight boron carbide or 0.1% samarium oxide has similar thermal neutron absorption properties.

According to several exemplary embodiments, the proppant includes a concentration of about 0.01%, about 0.03%, about 0.05%, about 0.1%, or about 0.5% to about 1.0%, about 2%, about 5%, about 7%, or about 10% by weight of a gadolinium compound thermal neutron absorbing material, or a concentration of about 0.1% to 4.0% by weight of a samarium compound thermal neutron absorbing material. Suitable tagged proppants could also contain combinations of two or more different thermal neutron absorbing materials, such as gadolinium oxide in one portion of the proppant grains and samarium oxide in another portion of (or the balance of) the proppant grains.

According to several exemplary embodiments, the proppant may be a ceramic proppant, sand, resin coated sand, plastic beads, glass beads, and other ceramic or resin coated proppants. Such proppants may be manufactured according to any suitable process including, but not limited to continuous spray atomization, spray fluidization, spray drying, or compression. Suitable proppants and methods for manufacture are disclosed in U.S. Pat. Nos. 4,068,718, 4,427,068, 4,440,866, 5,188,175, and 7,036,591, the entire disclosures of which are incorporated herein by reference.

According to several exemplary embodiments, the thermal neutron absorbing material is added to the ceramic proppant during the manufacturing process such as continuous spray atomization, spray fluidization, spray drying, or compression. Ceramic proppants vary in properties such as apparent specific gravity by virtue of the starting raw material and the manufacturing process. The term "apparent specific gravity" as used herein is the weight per unit volume (grams per cubic centimeter) of the particles, including the internal porosity. Low density proppants generally have an apparent specific gravity of less than 3.0 $g/cm^3$ and are typically made from kaolin clay and alumina. Intermediate density proppants generally have an apparent specific gravity of about 3.1 to 3.4 $g/cm^3$ and are typically made from bauxitic clay. High strength proppants are generally made from bauxitic clays with alumina and have an apparent specific gravity above 3.4 $g/cm^3$. According to several exemplary embodiments, thermal neutron absorbing material may be added in the manufacturing process of any one of these proppants to result in a suitable proppant. Ceramic proppant may be manufactured in a manner that creates porosity in the proppant grain. A process to manufacture a suitable porous ceramic is described in U.S. Pat. No. 7,036,591, the entire disclosure of which is incorporated by reference herein. In this case the thermal neutron absorbing material is impregnated into the pores of the proppant grains to a concentration of about 0.025 to about 4.0% by weight.

According to several exemplary embodiments, the thermal neutron absorbing material is incorporated into a resin material and ceramic proppant or natural sands are coated with the resin material containing the thermal neutron absorbing material. Processes for resin coating proppants and natural sands are well known to those of ordinary skill in the art. For example, a suitable solvent coating process is described in U.S. Pat. No. 3,929,191, to Graham et al., the entire disclosure of which is incorporated herein by reference. Another suitable process such as that described in U.S. Pat. No. 3,492,147 to Young et al., the entire disclosure of which is incorporated herein by reference, involves the coating of a particulate substrate with a liquid, uncatalyzed resin composition characterized by its ability to extract a catalyst or curing agent from a non-aqueous solution. Also a suitable hot melt coating procedure for utilizing phenol-formaldehyde novolac resins is described in U.S. Pat. No. 4,585,064, to Graham et al., the entire disclosure of which is incorporated herein by reference. Those of ordinary skill in the art will be familiar with still other suitable methods for resin coating proppants and natural sands.

Therefore, according to several exemplary embodiments, a method is provided which may be implemented with ceramic proppant or natural sands coated with or otherwise containing the thermal neutron absorbing material. According to several exemplary embodiments, a suitable thermal neutron absorbing material is gadolinium oxide, which has an effective thermal neutron absorbing capacity at a low concentration in tagged proppant or sand. The concentration of such thermal neutron absorbing materials can be on the order of about 0.025% to about 4.0% by weight of the proppant. For gadolinium compounds such as gadolinium oxide, the concentration can be about 0.025% to about 1.0% by weight of the proppant. These concentrations are low enough such that the other properties of the tagged proppant (such as crush strength) are essentially unaffected by the addition of the high capture cross section material. According to several exemplary embodiments, any high capture cross-section thermal neutron absorbing material may be used. According to several exemplary embodiments, gadolinium oxide or other gadolinium containing materials are used because a smaller amount of the gadolinium-containing tagging material is required relative to other thermal neutron absorbing materials (such as other rare earth elements). The weight percentage required to produce similar thermal neutron absorption properties for other high thermal neutron capture cross section materials will be a function of the density and molecular weight of the material used, and on the capture cross sections of the constituents of the material.

A manufactured ceramic proppant containing about 0.025% to about 1.0% by weight of a thermal neutron absorbing material can be cost effectively produced, and can provide useful identifying signals when comparing PNC log responses run before and after placement of the proppant in the borehole region.

A well site operation can involve blending water with the proppant including a thermal neutron absorbing material creating a slurry, which is pumped down the well. The pumped slurry is pumped into the borehole region and possibly into fractures induced in the formation adjacent to the borehole region.

In one or more exemplary embodiments, a logging truck at the well site can lower a neutron, compensated neutron, or PNC logging tool to a depth of the pack material placed in the borehole region. Power from the logging truck (or skid) can be transmitted to the logging tool, which records and transmits logging data as the tool is logged past the pack material placed in the borehole region and the formations above and/or below the pack material.

According to several exemplary embodiments, the use of PNC calculated taggant (e.g. gadolinium) yields computed from PNC tool capture gamma ray spectra to locate NRT tagged pack material in gravel pack, frac pack, and cementing operations, including a new capture gamma ray spectroscopy-based method to assist in distinguishing the pack material placed inside the casing from that placed outside the borehole region in a formation fracture.

FIG. 1 shows a Monte Carlo simulation of a PNC capture gamma ray decay curve in a cased downhole formation in which $Gd_2O_3$ tagged proppant/pack material has been placed in a gravel pack annulus in the borehole region between the outer well casing and an interior liner/screen. The figure also shows a similar decay curve obtained in the same formation with no gravel pack present. The time scale on the horizontal axis is between the start of the neutron burst (0.0 on time axis) out to 1000 μsec (the approximate time in most PNC-type tools when the next neutron burst would occur). Note that during the first ~200 microseconds after the end of the burst, the capture gamma radiation from the borehole region (including the gravel pack) is significant compared to the capture gamma radiation coming from the formation (which would include any fractures in the formation). And especially in the first ~100 microseconds after the burst, the borehole component count rate dominates the formation component count rate. Also note in FIG. 1 that after ~200-400 microseconds, the count rate coming from the formation is dominant.

Typical PNC tools operating to compute formation capture cross-sections pulse roughly every 1000 μsec. These types of PNC tools, pulsing in the so-called "sigma mode", and the resulting formation and borehole component capture cross section measurements and detector count rates obtained, are the tools described in U.S. Pat. No. 8,100,177 et. al., etc., as listed above, to locate tagged proppant in fractures, gravel packs, frac packs, and cement using non-spectral methods. These sigma-mode tools can also process the capture gamma ray spectra collected in time gates between the neutron bursts, and especially including spectral data in the time gates farther from the neutron bursts (indicated in FIG. 1 as the "formation gate"). The resulting Gd yields computed from the capture spectra will have a large percentage of the detected gamma rays coming from the formation (including any NRT tag material in the formation fractures). Hence, the taggant yield computed using a sigma-mode pulsing scheme can have a relatively high formation to borehole contribution.

PNC logging tools can also be pulsed at a much higher pulse frequency using a so-called "CO mode" pulsing scheme, originally designed to spectrally detect carbon and oxygen inelastic gamma radiation during the neutron bursts (and used to distinguish oil from water in downhole formations). Capture cross sections are not generally computed when the CO-mode is used. When operating in the CO-mode, the generator generally pulses every 100 μsec (or less in some tool designs). Capture gamma radiation can also be collected using CO mode tools between the neutron bursts, in most applications to spectrally resolve the capture gamma yields from Si, Ca, Cl, H, Fe, and other elements in the formation and borehole. When CO-mode tools are used in NRT applications, Gd yields can also be obtained from the capture gamma spectra between the neutron bursts. Due to the much higher pulse rate of CO-mode tools, however, each subsequent neutron burst comes only 100 μsec after the previous burst, and as can be seen in FIG. 1, during the first 100 μsec after the burst, the borehole component decay is dominant. Hence in the CO mode, a significantly higher percentage of the detected gamma rays will be coming from the borehole region, including the GP annulus between the casing and liner/screen. Therefore when the PNC tool is operating in CO mode, the Gd taggant yield computed from the capture spectra will preferentially detect the Gd gammas coming from the gravel pack region relative to Gd gammas coming from fractures out in the formation. The time interval between the neutron bursts of 1,000 μsec is only approximate for "sigma mode" tools—the primary consideration is that the time interval is long enough for the borehole component to decay adequately between the bursts such that good measurements can be made of the formation component parameters. Similarly, the time interval between the neutron bursts for "CO mode" operations may vary significantly from 100 μsec. As such, the time interval needs to be short enough so that adequate statistical precision will be obtained in the inelastic gamma ray based parameters.

Hence in an NRT application, if the PNC tool logs in separate passes in CO-mode and in sigma-mode, the two resulting taggant (Gd) yields will have different relative percentages of detected taggant signal coming from the gravel pack annulus inside the casing versus the fractures out in the formation (placed there via a frac pack). Comparing the two taggant yields, possibly normalized in an interval of the well where the gravel pack is present, but not near any induced formation fractures (i.e. away from any perforations) can indicate the additional taggant in the formation fractures where the (normalized) sigma mode yield exceeds the CO mode yield.

In an embodiment using only sigma-mode logging, spectral data can be processed and elemental yields computed, including the taggant yield, in two different time gates between the neutron bursts. The first time gate is positioned relatively near the end of the neutron bursts, possibly within the time interval in FIG. 1 indicated as the borehole time gate, in which time gate the borehole component decay counts are dominant. The second time gate is positioned later in time after each of the neutron bursts, in a time interval where the formation decay component counts dominate, such as during the formation gate in FIG. 1. The taggant yield from the second (later) time gate can then be compared, possibly after normalization as described above, with the taggant yield computed during the first (earlier) time gate to indicate the percentage of taggant yield from the formation region relative to the borehole region, and also to identify the proppant placed in the formation, where the taggant yield determined from the later time gate spectral data exceeds the (possibly normalized) taggant yield determined from the earlier time gate data.

In many NRT gravel pack, frac pack, and cementing applications, another advantage of the capture gamma ray spectroscopy based methods discussed above is the elimination of the requirement for a PNC log run before the NRT placement procedure, and the comparison of before and after placement logs. In all of the wells we have logged to date with PNC tools and in which the PNC gamma ray data were spectrally processed to obtain gadolinium yields, there has been no gadolinium detected in the formation or borehole region on the before-placement PNC logs (that is, prior to the placement of the gadolinium taggant). Hence all of the Gd detected on the after-placement log was due to the taggant itself. Therefore, when analyzing the Gd yield data, there is generally no need to overlay or compare the before and after placement yield measurements (this overlay procedure is generally needed when analyzing count rate, C/I ratio, N/F ratio, and formation cross section data). Hence the logging procedures can be simplified when capture gamma spectroscopy capable PNC tools are utilized. Also in many gravel pack, frac pack, and cementing applications, it is logistically very difficult to obtain a before pack measurement. The Gd yields from the after pack CO mode capture gamma spectra (or alternatively from capture gamma spectra in an early, borehole component dominated, time gate after the neutron bursts in sigma mode logging) in gravel packing and in cementing operations should be adequate in most situations to determine the placement of the taggant. In frac packing operations it may be advantageous to run and compare the Gd yields from PNC CO mode and sigma mode PNC logs (as in the example discussed in FIG. 2). And in some conventional fracturing and cementing applications, it should be possible to run only the sigma mode after frac logs to obtain and interpret the Gd yields to locate the induced fractures or tagged cement.

In another possible embodiment, it may also be possible to resolve Gd taggant coming from the GP region from Gd taggant coming from the formation fractures by using two different Gd basis spectra in the spectral deconvolution process used to obtain the Gd yields (the Gd basis spectrum from the GP annular region will have a different shape (less Compton scattering) than the basis spectrum of the Gd from out in the fracture. The two resulting different Gd yields computed from the capture spectral deconvolution process will be indicative of the Gd coming from the two different regions respectively. A somewhat analogous method was previously described for detecting radioactive tracers in a conventional frac job (to distinguish the radioactive tracers placed in an induced fracture from any residual radioactive tracers in the borehole region (see U.S. Pat. Nos. 4,825,073 and 4,939,361). Although this alternative, radioactive-tracer spectroscopy-based method may also work, it does not use PNC tools or capture gamma ray spectroscopy, nor does it anticipate the use of our non-radioactive tracers, and it is likely to be less robust than the method described in detail in this patent disclosure using different pulsing modes for PNC tools.

The following example is illustrative of the methods discussed above.

EXAMPLE

Figure 2:
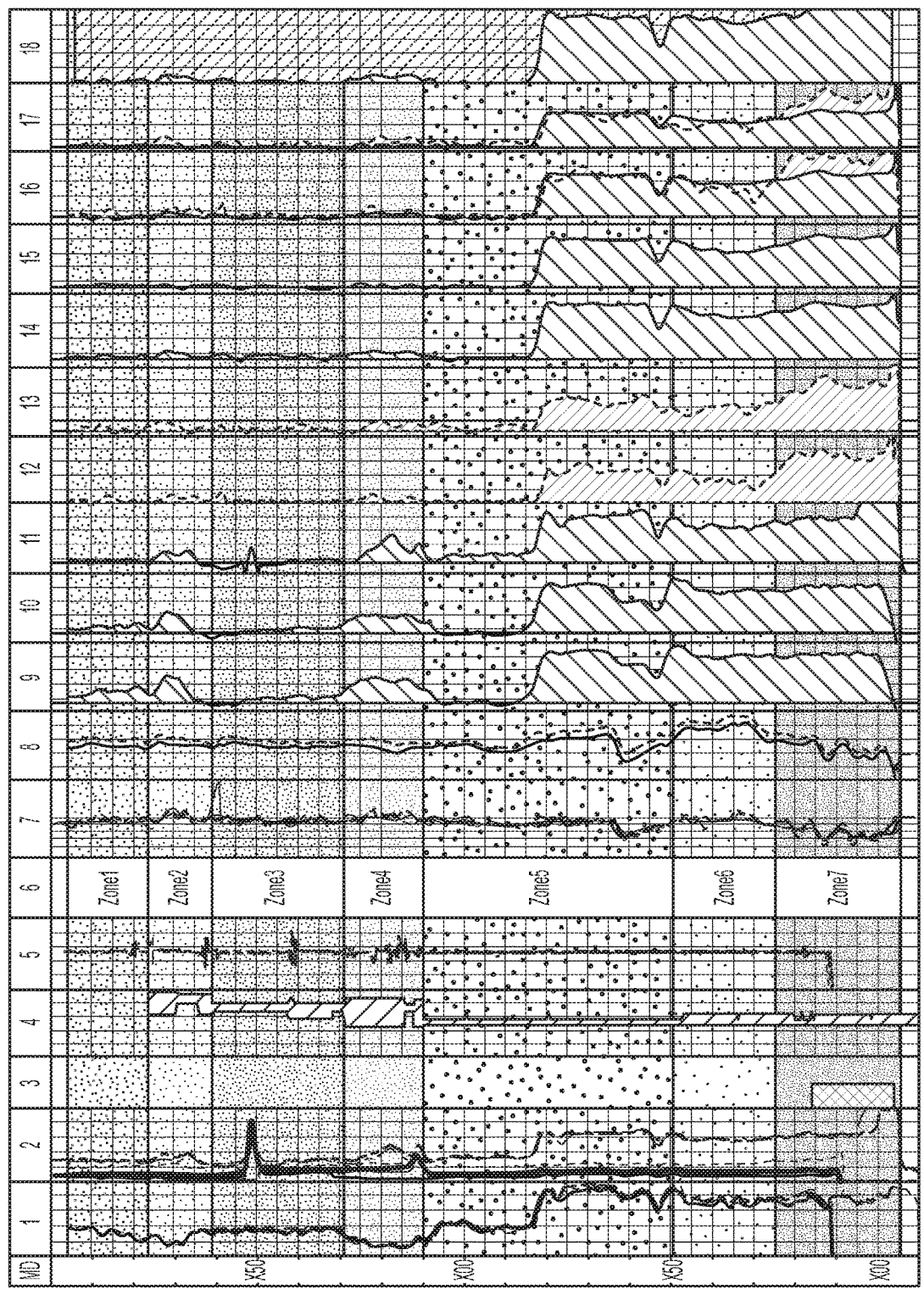
FIG. 2 is an exemplary pulsed neutron tool-based field well log for identification of tagged material in induced fractures in the formation and the borehole region.

The use of the present disclosure was recently demonstrated in a field well, as illustrated in FIG. 2, which includes various data collected in two detectors in the pulsed neutron tool during and between the neutron bursts that were processed to develop the curves in FIG. 2 which were then utilized to detect proppant tagged with a material having a high thermal neutron capture cross section in the fractures. This well contained a gravel pack annulus and was perforated. $Gd_2O_3$ tagged proppant was placed in the formation and in a gravel pack annulus inside the well casing in a frac pack operation. The well was logged with a dual-detector PNC logging tool only after the taggant had been emplaced (no before pack NRT log data was available). After pack logs were run in both CO mode and sigma mode, the resulting formation and borehole component capture cross sections and count rates were computed from the sigma mode log. Gd yields were independently computed in the sigma mode and CO mode passes.

The logs available for analysis in FIG. 2 are shown in tracks (the columns) the natural gamma ray log (track 1) when the neutron generator was off, natural gamma ray log when the neutron generator was on (track 2), perforation flag (track 3), fracture pack mechanical assembly (track 4), collar locater log (track 5), near-to-far ratio of detector count rates (track 7), formation sigma from the near and far detectors (track 8), borehole sigma from the near detector (track 9), borehole sigma from the far detector (track 10), silicon activation log (track 11), relative gadolinium yield from the near detector in sigma mode (track 12), relative gadolinium yield from the far detector in sigma mode (track 13), relative gadolinium yield from the near detector in CO mode (track 14), and relative gadolinium yield from the far detector in CO mode (track 15). The near and far detector overlays of the Gd yields from the CO mode log and from the sigma mode log are shown in tracks 16 and 17, respectively. The analyzed results of NRT proppant volume fraction is presented in track 18, shown in the attached file. The log presentation has been subdivided into 7 sub-intervals/zones where there are differences in borehole tubulars (zone 1 at top of log). Observations of the results shown in FIG. 2 are discussed in paragraphs (1) through (13) below.

(1) The natural gamma ray logs from top and bottom detectors when the neutron generator was off are shown in track 1. It is shown that the natural gamma ray logs are consistent and are also correlated well with frac pack assembly. For example, the readings of natural gamma ray logs are reduced at a depth interval where the wall of the assembly is thicker. The natural gamma ray logs also decrease slightly below a depth where the wall of the screen is thicker than the blank pipe.

(2) The natural gamma ray logs from the top detector (GR) shown in track 2 progressively increase during each subsequent pass during the logging operations, in all likelihood due to buildup of residual activation of the well tubulars. The natural gamma ray logs from the bottom detector (GR2, GR21) in track 2 increase even more dramatically, especially in the few feet at the very bottom of the logged interval. This is due to the neutron activation of materials near the tool, including not only the longer half-life of the casing activation, but also possibly due to shorter half-life activation of the materials in the formation, cement, and borehole. The bottom detector senses much more gamma radiation from short-lived neutron activations, since it follows the neutron generator up the borehole on each logging pass.

(3) The collar locater logs in track 5 correlate with the depths of the frac pack assembly in track 4.

(4) The near-to-far count rate ratio logs in track 7 do not change between the runs, meaning the formation gas/oil saturation remains basically constant throughout the logging operations.

(5) The apparent formation sigma logs from near (dotted line) and far (solid line) detectors in track 8 have a significant decrease near the bottom of zone 5 (at 8939 ft), which likely contributes to the reduction of borehole sigma logs in track 9 and track 10 at the same depth. The formation sigma in the near detector is consistently slightly higher than in the far detector due to the increased thermal neutron diffusion effects near the neutron source.

(6) The borehole sigma logs from the near detector (track 9) and from the far detector (track 10) show clear NRT signals near the middle of zone 5 (below 8917 ft), where the logs increase significantly compared to the depth interval of blank pipe above this depth where no NRT signal is observed. The increase of borehole sigma in other depth intervals (such as zone 2, 3, 4) are likely due to the increase of wall thickness of the frac pack assembly, which is primarily made of iron, which also has a high thermal neutron absorption cross section. As mentioned above, the decrease of borehole sigma logs in track 9 and track 10 near the bottom of zone 5 (at 8939 ft) is probably due to the significant decrease of the formation sigma at the same depth, since sigma-fm and sigma-bh are not totally independent parameters. However, the decrease of borehole sigma logs in track 9 and track 10 at the bottom of zone 5 (8947 ft) is due to incomplete NRT gravel packing, as it is also indicated on other pack-indicating logs at same depth as well (such as the silicon activation log in track 11 and the relative gadolinium yield logs from track 12 through track 15).

(7) The silicon activation log in track 11 also shows a very clear NRT signal near the middle of zone 5 (below 8917 ft). The reason is that proppant contains a high concentration of silicon. However, the silicon activation logs are somewhat affected by the neutron activation of other material, such as iron/manganese in zone 2 and zone 4, where the tubular wall thickness of the frac pack is increased.

(8) The relative gadolinium yield logs from the near and far detectors in the sigma mode are shown in track 12 and track 13. The relative gadolinium yield logs from the near and far detectors in the CO mode are shown in track 14 and track 15. The relative gadolinium yield logs in both sigma and CO modes show a good NRT signal near the middle of zone 5 (below 8917 ft) and are also cleaner in other zones (such as in zone 2 and zone 4), compared to borehole sigma logs and the silicon activation log. The reason is that the relative gadolinium yield measurement is much less affected by the presence of iron in the borehole region than the borehole sigma measurement. We also observed that the gadolinium yields determined from the CO mode compare more favorably with the packs indicated from the shallow-sensing sigma borehole and silicon activation logs than do the gadolinium yields computed from the sigma mode logs. This is due to the much higher neutron pulse rate of the CO mode, which (unlike the sigma mode logs) never allows the decay curves between bursts to decay to a time interval between the bursts where formation decay dominates. Hence the CO mode measurement is more borehole region sensitive than the sigma mode measurement, which is desirable for a gravel pack measurement (the opposite is true if one is looking for proppant out in the formation fractures, where the deeper sensing sigma mode Gd yield would be more desirable). Moreover, the relative gadolinium yield in zone 7 (where the well is perforated) is much higher than other gravel pack depth intervals in the sigma mode than in the CO mode. The time window for the capture spectrum is much farther from the neutron bursts and there are more contributions from the formation region in the sigma mode than in the CO mode. The formation in zone 7 was fractured and NRT proppant present in fractures (and also possibly in the borehole region outside the outer well casing) are contributing an additional Gd signal to the signal coming from the gravel pack. This may explain, that for gravel pack evaluation, the relative gadolinium yield from the CO mode may be more accurate. Lastly, the relative gadolinium yield log from the far detector (track 15) is less affected by borehole tubulars than that from the near detector (track 14) in zone 2, zone 3 and zone 4, due to its greater depth of investigation. Conversely, the relative gadolinium yield signals from the near detector in the above zones are somewhat more influenced by the thickness increase of the assembly.

(9) Tracks 16 and 17 show overlays of the Gd yields computed from the sigma mode and CO mode logs in the near and far detector, respectively. The yield logs were normalized in the blank pipe section of the GP annulus, well above the perforations. In tracks 16 and 17, the sigma mode Gd yield exceeds the CO mode Gd yield in zone 7 at the bottom of the well, where the perforations are located. This is the zone where tagged proppant in the fractures as well as in the annulus would be anticipated.

(10) Since the depth of investigation of the near detector is shallower than the far detector, the relative gadolinium yield log from the near detector in the CO mode may provide the best gravel pack evaluation. This would not be the case in situations involving looking for tagged proppant in formation fractures (where the sigma mode based Gd yield, possibly from the far detector and in a time gate remote from the neutron bursts where the formation component dominates, would generally be preferred).

(11) The proppant volume fraction (solid cross-hatching in track 18) is obtained by assuming no gravel pack (0%) near the middle of zone 5 (at 8910 ft) and the maximum gravel pack (100%) near the middle of zone 5 (at 8921 ft). Moreover, the volume differences in the annulus outside the pipe, the screen and the joints in the 7-in casing are corrected in the calculation of proppant volume fraction in the annulus. The unpacked volume fraction is shaded in dashed cross-hatching in track 18.

(12) The evaluation results in track 18 show that the top of gravel pack is clear and the proppant volume in the depth interval approaching the bottom of zone 5 (from 8921 ft to 8944 ft) is slightly higher than in the depth interval of zone 6 (from 8961 ft to 8971 ft). Furthermore, there is a void at depth at the bottom of zone 5 (about 8947 ft). Moreover, since the logging started just above 9004 ft, proppant volume evaluation was not indicated for depth below 9002 ft, due to the tool pick-up. Also the gravel pack measurement may be slightly overestimated for depths below 8976 ft, due to the likely presence of proppant in the induced formation fractures and/or the cement annular space outside the casing.

(13) Our evaluations of available logs indicate that NRT proppant is also present outside the gravel pack annulus in the vicinity of the perforations, probably in fractures in the formation, and possibly also in the near borehole region outside the outer casing. According to our analysis, these tagged fractures extend upward to about 8976 ft, a few feet above the top of the perforations. However, since the bottom of the PNC logged interval was at approximately 9002 ft., and hence did not cover the entire depth interval of the perforations and gravel pack, it's not possible to analyze how deep the tagged fractures might have extended downward below about 9002 ft.

Based on the results obtained in our modeled data and in this field test, it is clear that Gd yields computed from both CO mode and sigma mode capture gamma ray spectra can be used to locate NRT tagged proppant in gravel packs, and in the borehole region in general (including tagged cement), and give good agreement with more conventional gravel pack indicators, including the borehole-sigma log and the silicon activation log (both of which are known to have shallow depths of investigation and primarily sense only the borehole region). In addition, when the sigma mode Gd yields and the CO mode Gd yields are compared/overlaid, it is clear that the deeper sensing Gd yield measurement from the sigma mode is indicating the additional tagged material outside the casing in the formation fractures. It should be noted that although the taggant primarily discussed above is gadolinium, it should be possible to replace gadolinium with another element with a high thermal neutron capture cross section, including samarium, europium, and other rare earth elements, which have resolvable capture gamma ray spectra.

The foregoing detailed description is to be clearly understood as being given by way of illustration and example only, the spirit and scope of the present invention being limited solely by the appended claims.

What is claimed is:

1. A method for distinguishing particles placed in a borehole region from particles placed in a subterranean formation outside of the borehole region, comprising:
   (a) utilizing a slurry comprising a liquid and particles to place the particles into the borehole region, wherein all or a fraction of such particles includes a thermal neutron absorbing material;
   (b) obtaining a first data set by:
      (i) lowering into a borehole traversing the borehole region containing the particles a pulsed neutron logging tool comprising a pulsed neutron source and a detector,
      (ii) emitting pulses of neutrons from the pulsed neutron source into the borehole region at intervals of one pulse per about 1,000 µsec,
      (iii) detecting capture gamma rays resulting from nuclear reactions in the borehole region and the subterranean formation;
   (c) obtaining a second data set by:
      (i) lowering into a borehole traversing the borehole region containing the particles a pulsed neutron logging tool comprising a pulsed neutron source and a detector,
      (ii) emitting pulses of neutrons from the pulsed neutron source into the borehole region at intervals of about one pulse per about 100 µsec,
      (iii) detecting capture gamma rays resulting from nuclear reactions in the borehole region and the subterranean formation; and
   (d) comparing the first data set and the second data set to determine the effectiveness of particle placement in the borehole region and/or the formation region.

2. The method of claim 1, wherein the thermal neutron absorbing material comprises gadolinium, boron carbide, europium, or samarium or any combinations thereof.

3. The method of claim 1, wherein the thermal neutron absorbing material comprises from about 0.025 wt % to about 4 wt % based on the total weight of the particles including the thermal neutron absorbing material.

4. The method of claim 1, wherein the particles include a gadolinium concentration of about 0.01 wt % to about 10 wt % based on the total weight of the particles.

5. The method of claim 1, wherein the particles include a samarium concentration of about 0.1 wt % to 4.0 wt % based on the total weight of the particles.

6. The method of claim 1, wherein the particles are selected from the group of sand, gravel, and ceramic proppant and any mixtures thereof.

7. The method of claim 1, wherein the slurry is a gravel-pack slurry and further comprising correlating a location of the particles to a depth measurement of the borehole to determine a location, height, and/or percent fill of the particles placed in a gravel-pack zone inside the casing.

8. The method of claim 1, wherein the slurry is a frac-pack slurry and further comprising correlating a location of the particles to a depth measurement of the borehole to determine a location, axial distribution, radial distribution and/or height of the particles placed in a frac-pack zone inside the casing in the vicinity of a fracture in the formation and to assist in determining the location and height of the fracture.

9. The method of claim 1, wherein the slurry is a cement slurry and further comprising correlating a location of the particles to a depth measurement of the borehole to determine an effectiveness of particle placement in the cement annulus between the casing and the subterranean formation.

10. The method of claim 1, wherein each data set comprises the yield of the thermal neutron absorbing material, computed from the spectra of the detected capture gamma rays.

11. A method for distinguishing particles placed in a borehole region from particles placed in a subterranean formation outside of the borehole region, comprising:
    (a) utilizing a gravel-pack slurry comprising a liquid and gravel-pack particles to place the particles into the borehole region, wherein all or a fraction of such gravel-pack particles includes a thermal neutron absorbing material;
    (b) obtaining a first data set by:
       (i) lowering into a borehole traversing the borehole region containing the gravel-pack particles a pulsed neutron logging tool comprising a pulsed neutron source and a detector, (ii) emitting pulses of neutrons from the pulsed neutron source into the borehole region at intervals of one pulse per about 1,000 μsec, (iii) detecting capture gamma rays resulting from nuclear reactions in the borehole region and the subterranean formation;

(c) obtaining a second data set by:

(i) lowering into a borehole traversing the borehole region containing the gravel-pack particles a pulsed neutron logging tool comprising a pulsed neutron source and a detector, (ii) emitting pulses of neutrons from the pulsed neutron source into the borehole region at intervals of about one pulse per about 100 μsec, (iii) detecting capture gamma rays resulting from nuclear reactions in the borehole region and the subterranean formation; and (d) comparing the first data set and the second data set to determine the effectiveness of gravel-pack placement in the borehole region.

12. The method of claim 11, wherein the thermal neutron absorbing material comprises gadolinium, boron carbide, europium, or samarium or any combinations thereof.

13. The method of claim 11, wherein the thermal neutron absorbing material comprises from about 0.01 wt % to about 10 wt % based on the total weight of the particles including the thermal neutron absorbing material.

14. The method of claim 11, wherein the gravel-pack particles are selected from the group of sand, gravel, and ceramic proppant and any mixtures thereof.

15. The method of claim 11, further comprising correlating a location of the particles to a depth measurement of the borehole to determine a location, height, and/or percent fill of the gravel-pack particles placed in a gravel-pack zone inside the casing.

* * * * *